United States Patent
Yu

(10) Patent No.: US 9,669,889 B2
(45) Date of Patent: Jun. 6, 2017

(54) COVER FOR BICYCLE SADDLES AND A METHOD FOR MAKING IT

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

(*) Notice: Subject to any disclaimer, the term of this patent is extended or adjusted under 35 U.S.C. 154(b) by 77 days.

(21) Appl. No.: 14/829,767

(22) Filed: Aug. 19, 2015

(65) Prior Publication Data
US 2016/0052579 A1 Feb. 25, 2016

(30) Foreign Application Priority Data

Aug. 22, 2014 (TW) .............................. 103129062 A
Aug. 26, 2014 (TW) .............................. 103129369 A

(51) Int. Cl.
| B62J 1/18 | (2006.01) |
|---|---|
| B62J 1/20 | (2006.01) |
| B62J 1/00 | (2006.01) |
| B62J 1/26 | (2006.01) |

(52) U.S. Cl.
CPC . *B62J 1/18* (2013.01); *B62J 1/00* (2013.01); *B62J 1/007* (2013.01); *B62J 1/20* (2013.01); *B62J 1/002* (2013.01); *B62J 1/005* (2013.01); *B62J 1/26* (2013.01)

(58) Field of Classification Search
CPC ......... B62J 1/18; B62J 1/00; B62J 1/20; B62J 1/007; B62J 1/26; B62J 1/1002; B62J 1/005; B62J 1/001

USPC .......... 297/195.1, 195.13, 214, 202, 452.41, 297/452.48
See application file for complete search history.

(56) References Cited

U.S. PATENT DOCUMENTS

| 5,720,518 | A | | 2/1998 | Harrison | |
|---|---|---|---|---|---|
| 6,030,035 | A | * | 2/2000 | Yates | B62J 1/18 297/195.1 |
| 6,074,001 | A | * | 6/2000 | Yates | B62J 1/00 297/195.1 |
| 6,131,994 | A | * | 10/2000 | Yates | B62J 1/002 297/195.1 |
| 6,290,794 | B1 | * | 9/2001 | Yates | B62J 1/18 156/145 |
| 6,402,236 | B1 | * | 6/2002 | Yates | B62J 1/005 297/201 |
| 6,481,792 | B1 | * | 11/2002 | Goin | B62J 1/12 297/195.13 |

(Continued)

FOREIGN PATENT DOCUMENTS

| DE | 29603845 U1 | 5/1996 |
|---|---|---|
| EP | 2689993 A1 | 1/2014 |
| WO | 2012/123876 A1 | 9/2012 |

*Primary Examiner* — Chi Q Nguyen
(74) *Attorney, Agent, or Firm* — Browdy and Neimark, P.L.L.C.

(57) ABSTRACT

A cover for a bicycle saddle comprises a basic layer and a first auxiliary layer. The basic layer is made of a first plastic material and has a top surface with a first friction factor. The first auxiliary layer is made of a second plastic material with a second friction factor and is directly disposed on a predetermined area of the top surface of the basic layer. The second friction factor is smaller than the first friction factor. A method is provided for making a cover as above.

6 Claims, 5 Drawing Sheets

(56) References Cited

U.S. PATENT DOCUMENTS

| | | | |
|---|---|---|---|
| 2005/0046245 A1 | 3/2005 | Yu | |
| 2005/0121951 A1* | 6/2005 | Yu | B62J 1/00 297/195.1 |
| 2011/0018315 A1* | 1/2011 | DeRoy | B62J 1/002 297/202 |
| 2014/0054937 A1* | 2/2014 | Sam | B62J 1/22 297/214 |
| 2014/0070576 A1* | 3/2014 | Wu | B62J 1/18 297/214 |
| 2015/0251717 A1* | 9/2015 | Portz | B62J 1/005 297/201 |

\* cited by examiner

COVER FOR BICYCLE SADDLES AND A METHOD FOR MAKING IT

BACKGROUND OF THE INVENTION

1. Field of the Invention

The present invention relates to a bicycle saddle, and particularly relates to a cover for a bicycle saddle and a method for making it.

2. Brief Description of the Prior Art

Saddles for bicycles are known to include generally a rigid support frame, a cover and an elastic member disposed therebetween. The cover is often made of leather or cloth materials for being the outermost layer of a bicycle saddle to contact with a user's body. The primary drawback of such a prior art cover is that it has a top surface with a uniform friction factor so that during the pedaling process, the inside thigh areas of the user repeatedly contact the side portions of the cover, and are continuously rubbed thereagainst, which often causes local skin rashes and grazes.

BRIEF SUMMARY OF THE INVENTION

In view of the above, it is an object of the present invention to provide a cover for a bicycle saddle that reduces the friction between a bicycle saddle and a user's body. It is another object to provide a cover of a bicycle saddle wherein the top surface thereof has at least a selected area with a friction factor being smaller than that of any other areas of the top surface. It is also an object of the present invention to provide a method of making a cover for a bicycle saddle having a top surface having a selected area with a friction factor being smaller than that of any other areas of the top surface.

These and other objects are achieved by a new cover presented hereinafter. The new cover for a bicycle saddle according to this present invention comprises a basic layer and a first auxiliary layer. The basic layer is made of a first plastic material and has a top surface with a first friction factor. The first auxiliary layer is made of a second plastic material with a second friction factor and is directly disposed on a predetermined area of the top surface of the basic layer. The second friction factor is smaller than the first friction factor.

In one embodiment of the cover, the basic layer has a narrow front portion for fitting between the crotch of a bicycle rider, and a wide rear portion for supporting the buttocks of a bicycle rider. The narrow front portion includes a center side, a right side and a left side. The first auxiliary layer has a first strip portion and a second strip portion. The first strip portion is directly disposed on the right side of the narrow front portion of the basic layer, and the second strip portion is directly disposed on the left side of the narrow front portion of the basic layer.

In another embodiment of the cover, the first plastic material is a polyurethane leather. The second plastic material is a mixture including polycarbonate fibre and sillicone resin. The first auxiliary layer is disposed on the predetermined area of the top surface of the basic layer by a screen printing process.

According to another aspect of the present invention, a method is provided for making the above mentioned cover. The method comprises the steps of preparing a basic layer made of a first plastic material with a first friction factor on a top surface thereof; suiting the basic layer to have a narrow front portion for fitting between the crotch of a bicycle rider, and a wide rear portion for supporting the buttocks of a bicycle rider; preparing a first auxiliary layer made of a second plastic material with a second friction factor being smaller than the first friction factor, and then disposing the first auxiliary layer directly on at least one side of the narrow front portion of the basic layer for forming a smooth area.

BRIEF DESCRIPTION OF THE DRAWINGS

Further characteristics and advantages of the present invention will become better apparent from the detailed description that follows of a preferred but not exclusive embodiment of the cover and the method of making it according to the present invention, illustrated by way of non-limiting example in the accompanying drawings, wherein.

DETAILED DESCRIPTION OF THE INVENTION

Figure 1:
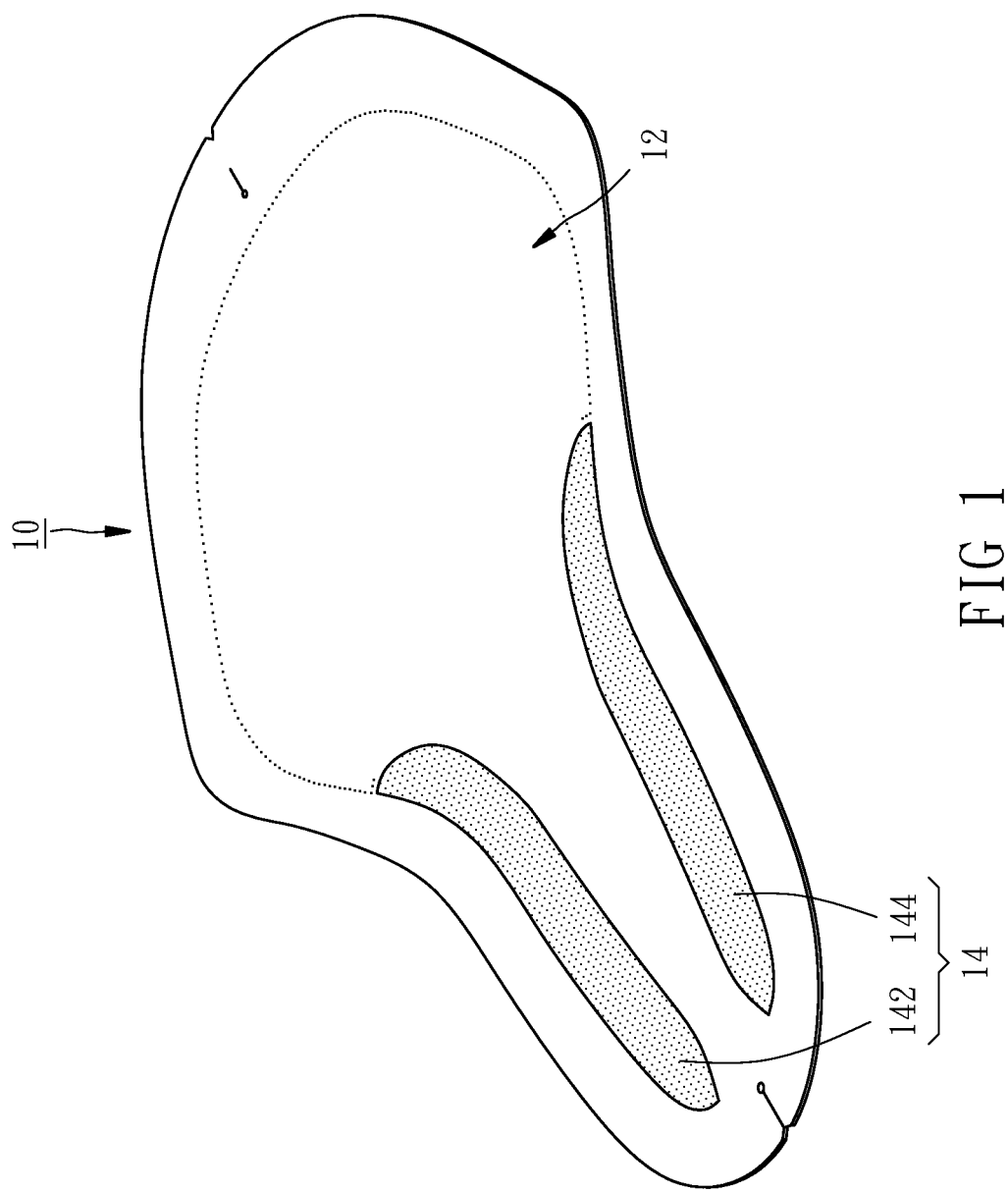
FIG. 1 is a perspective view of a basic layer of a first embodiment of the present invention.

Referring firstly to FIGS. 1-4, a cover according to the present invention is generally designated by the reference numeral 10. The cover 10 has a basic layer 12 and a first auxiliary layer 14. In this embodiment, the basic layer 12 is made of polyurethane leathers and has a top surface 120. The static friction factor of the top surface 120 is about 0.6 or above measured by ASTM D-1894 test method.

The basic layer 12 is shaped to have a narrow front portion 16, a wide rear portion 18 and an edge portion 20 defined by the border line 122 of the layer 12 and the dot line 124 marked on the top surface 120. The narrow front portion 16 is designed for fitting between the crotch of a bicycle rider and includes a center side 162, a right side 164 and a left side 166. The wide rear portion 18 is designed for supporting the buttocks of a bicycle rider. The edge portion 20 is designed for attaching to a frame of a bicycle saddle.

The first auxiliary layer 14 is made of a material having a friction factor be smaller than that of the top surface 120 of the basic layer. In this embodiment, the material is a mixture including polycarbonate fibre and sillicone resin with a kinetic friction factor is or less than 0.3. The friction factors are measured by ASTM D-1894 test method. The first auxiliary layer 14 has a first strip portion 142 and a second strip portion 144, which are directly and respectively disposed on the right side 164 and the left side 166 of the narrow front portion 16 of the basic layer 12 by a screen printing process. The thickness of the first strip portion 142 and the second strip portion 144 is or not less than 0.03 mm.

Figure 3:
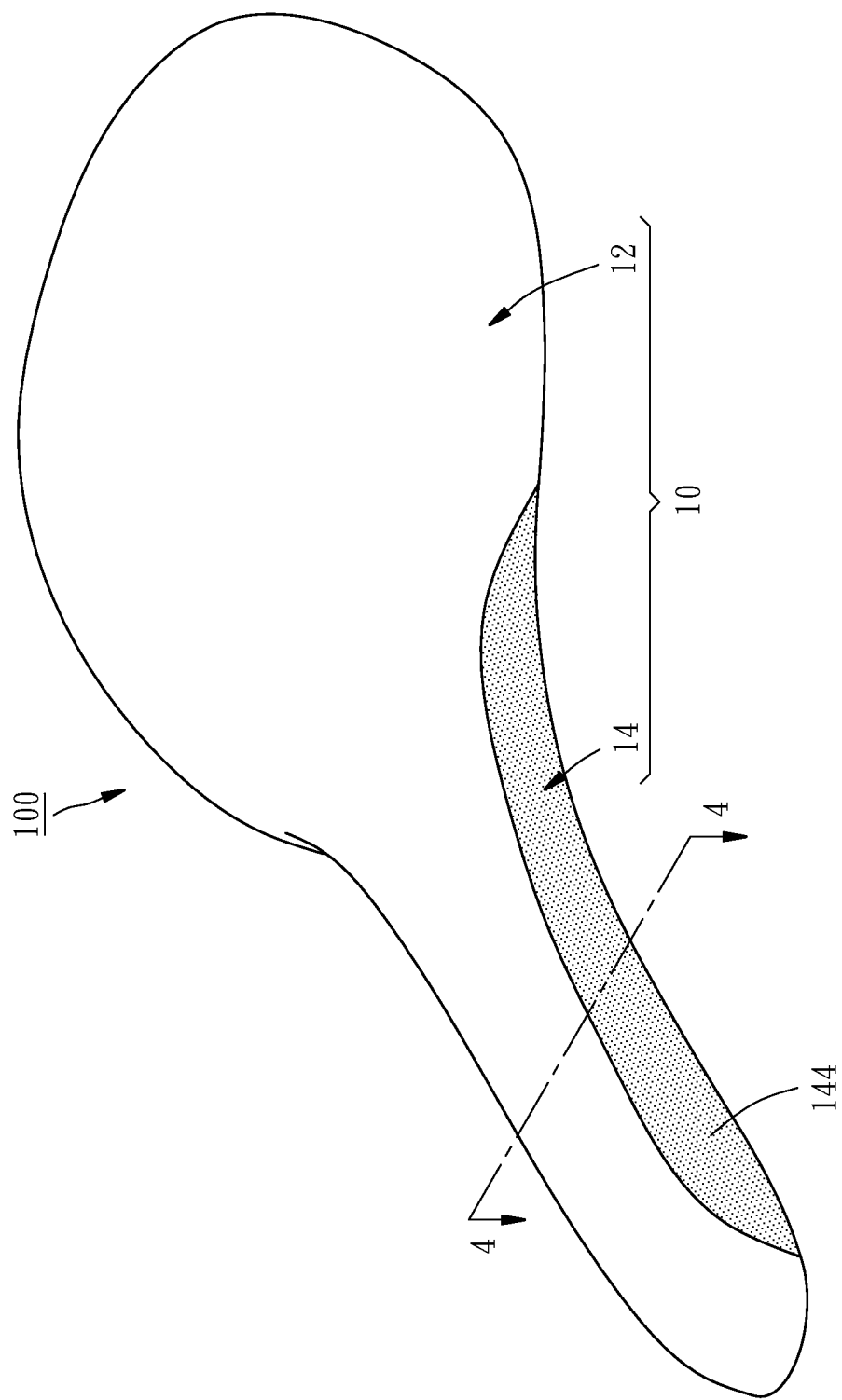
FIG. 3 is a perspective view of a bicycle saddle with the first embodiment.
Figure 4:
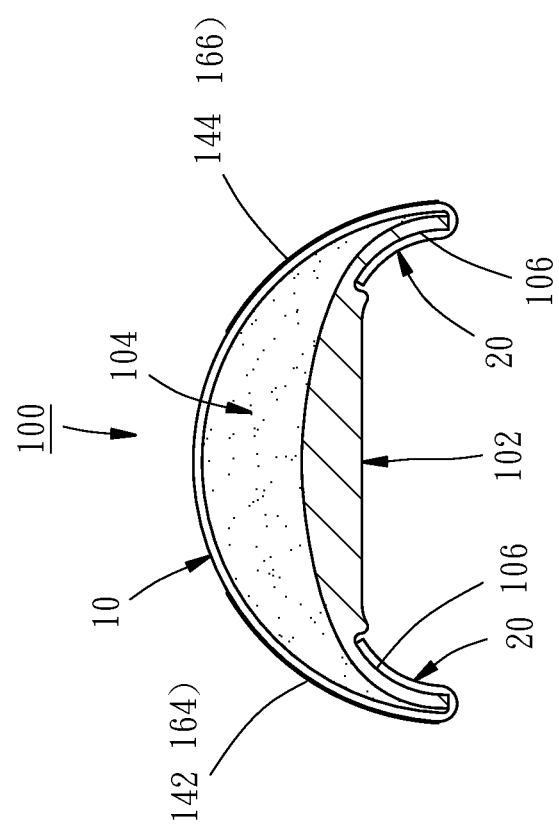
FIG. 4 is a cross-section taken along the plane of 4-4 in FIG. 3.

As shown in FIGS. 3 and 4, a bicycle saddle 100 includes a rigid or semi-rigid frame 102 and an elastic member 104 secured on the frame 102. The cover 10 is applied over the elastic member 104 in such a way that the edge portion 20 is attached to the inner edge side 106 of the frame 102 and the first strip portion 142 and the second strip portion 144 are positioned between the crotch of a bicycle rider.

In view of the above, it will be seen that when a rider is seated on the saddle 100, the first strip portion 142 and the second strip portion 144 of the cover 10 will work as two smooth areas to contact with the rider's crotch. Thus, the compressions and rubbing caused by the pedaling motion, in the inside thigh areas of the rider, will be reduced effectively.

According to the present invention, the cover 10 is produced by a method described below. In light of the method, the first step is to prepare a basic layer 12 made of polyurethane leathers with a static friction factor about 0.6 or above measured by ASTM D-1894 test method on a top surface 120 thereof.

Figure 2:
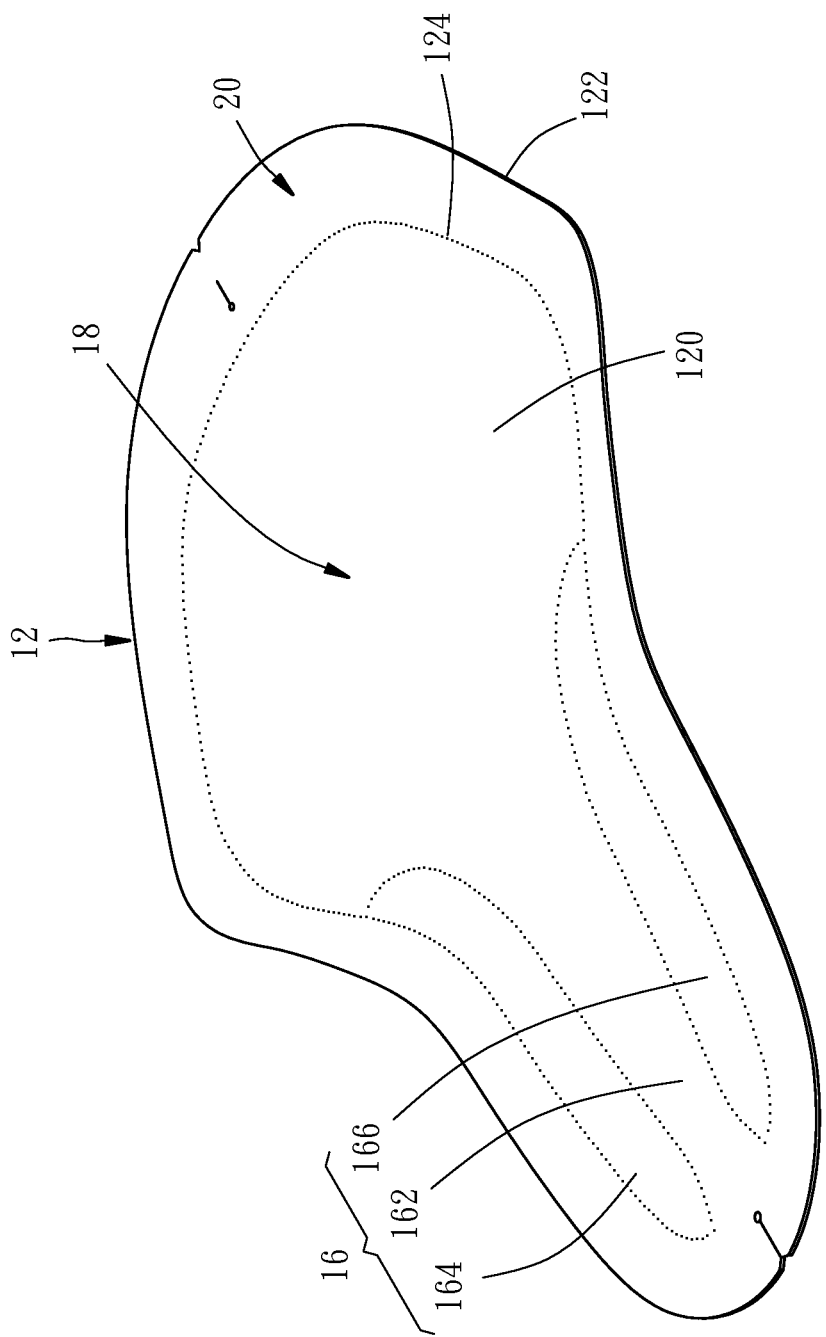
FIG. 2 is a perspective view a sheet of the first embodiment.

The second step is to cut out the basic layer 12 to have a narrow front portion 16, a wide rear portion 18 and an edge portion 20, as shown in FIG. 2.

The third step is to provide a first auxiliary layer 14 made of a mixture including polycarbonate fibre and sillicone resin with a kinetic friction factor being or less than 0.3.

And the following step is to dispose the first auxiliary layer 14 respectively on a right side 164 and a left side 166 of the narrow front portion 16 of the basic layer 12 by a screen printing process so that two smooth areas are formed thereon, such as the first strip portion 142 and the second strip portion 144 of the cover 10 shown in FIGS. 3 and 4.

Figure 5:
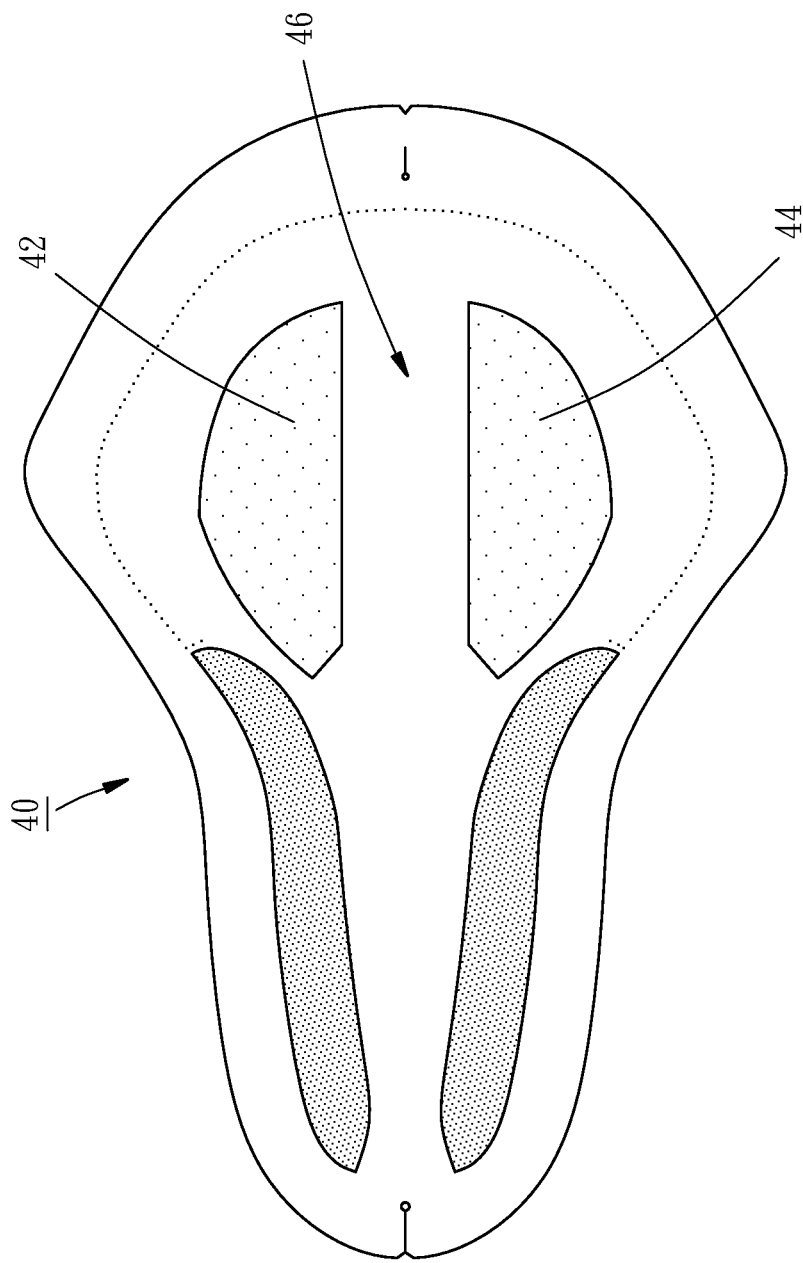
FIG. 5 is a perspective view of a sheet of a second embodiment of the present invention.

Referring further to FIG. 5, the drawing shows a cover 40 for a bicycle saddle which is a second embodiment according to the present invention. The cover 40 is extremely similar to the cover 10. The difference between them is that the cover 40 further includes two anti-slip areas 42 and 44 positioned on a wide rear portion 46 of the cover 40. The anti-slip areas 42 and 44 are made of a third plastic material with a third friction factor being larger than the first friction factor. The function of such anti-slip areas is to increase the sticking performance between the rider's buttocks and the wide rear portion of the cover so that during the pedaling motion, the compressions and rubbing in the inside thigh areas of the rider, will be reduced notably.

According to another aspect of the present invention, the method of making the anti-slip areas 42 and 44 of the cover 40 comprises the steps of preparing a second auxiliary layer made of a third plastic material with a third friction factor being larger than the first friction factor, and then disposing the second auxiliary layer directly and respectively on a predetermined area of the wide rear portion, such as the right and left sides thereof.

What is claimed is:

1. A cover for a bicycle saddle, comprising:
a basic layer and a first auxiliary layer;
said basic layer being made of a first plastic material and having a top surface with a first friction factor;
said first auxiliary layer being made of a second plastic material with a second friction factor;
said first auxiliary layer being directly disposed on a predetermined area of said top surface of said basic layer; and
said second friction factor being smaller than said first friction factor,
wherein said basic layer has a narrow front portion for fitting between the crotch of a bicycle rider, and a wide rear portion for supporting the buttocks of a bicycle rider; said narrow front portion includes a center side, a right side and a left side; said first auxiliary layer has a first strip portion and a second strip portion, said first strip portion is directly disposed on said right side of said narrow front portion of said basic layer, and said second strip portion is directly disposed on said left side of said narrow front portion of said basic layer.

2. The cover as claimed in claim 1, wherein said first plastic material is a polyurethane leather.

3. The cover as claimed in claim 2, wherein said second plastic material is a mixture including polycarbonate fibre and silicone resin.

4. The cover as claimed in claim 3, wherein a thickness of said first auxiliary layer is or not less than 0.03 mm.

5. The cover as claimed in claim 3, wherein said second friction factor is equal to or less than 0.3.

6. The cover as claimed in claim 1, wherein said cover further includes a second auxiliary layer being made of a third plastic material with a third friction factor, said third friction factor is larger than said first friction factor, and said second auxiliary layer is directly disposed on a predetermined area of said wide rear portion of said basic layer.

* * * * *